United States Patent
Murata et al.

[11] Patent Number: 5,965,069
[45] Date of Patent: Oct. 12, 1999

[54] METHOD FOR MAKING OPTICAL PREFORMS AND OPTICAL ELEMENTS BY PRESS

[75] Inventors: Jun Murata, Osaka; Takahisa Kondou; Masaaki Sunohara, both of Hyogo; Toshiaki Takano, Osaka; Chizuo Izumino, Osaka; Shoji Nakamura, Osaka, all of Japan

[73] Assignee: Matsushita Electric Industrial Co., Ltd., Osaka, Japan

[21] Appl. No.: 08/787,284

[22] Filed: Jan. 24, 1997

[30] Foreign Application Priority Data

Jan. 31, 1996 [JP] Japan .................................. 8-015762

[51] Int. Cl.⁶ .................................................. B29D 11/00
[52] U.S. Cl. ........................... 264/1.1; 264/2.4; 264/2.7; 425/808
[58] Field of Search .............................. 264/1.1, 2.7, 2.2, 264/2.4; 425/808

[56] References Cited

U.S. PATENT DOCUMENTS

| | | |
|---|---|---|
| 2,298,429 | 10/1942 | Smith . |
| 2,304,217 | 12/1942 | Tillyer . |
| 2,304,663 | 12/1942 | Smith et al. . |
| 2,332,674 | 10/1943 | Smith . |
| 2,432,668 | 12/1947 | Kingston . |
| 3,651,192 | 3/1972 | Erickson . |
| 5,100,590 | 3/1992 | Ruhlin ................... 264/2.7 |
| 5,204,127 | 4/1993 | Prusha . |
| 5,368,790 | 11/1994 | Greshes .................. 264/2.4 |
| 5,593,620 | 1/1997 | Galas . |
| 5,718,850 | 2/1998 | Takano et al. ............ 264/2.7 |
| 5,759,456 | 6/1998 | Watanabe et al. ........ 264/2.5 |

FOREIGN PATENT DOCUMENTS

| | | |
|---|---|---|
| 2 480 667 | 10/1981 | France . |
| 2 591 525 | 6/1987 | France . |
| 57-8121 | 1/1982 | Japan . |
| 57-187224 | 11/1982 | Japan ................... 264/1.1 |
| 59-212221 | 1/1984 | Japan . |
| 59-214622 | 4/1984 | Japan . |
| 59-104916 | 6/1984 | Japan . |
| 60-99618 | 6/1985 | Japan ................... 425/808 |
| 61-132313 | 6/1986 | Japan . |
| 61-251802 | 11/1986 | Japan ................... 425/808 |
| 62-227730 | 10/1987 | Japan . |
| 62-278136 | 12/1987 | Japan . |
| 1-67309 | 3/1989 | Japan . |
| 1-69313 | 3/1989 | Japan . |
| 1-174425 | 7/1989 | Japan . |
| 1-316252 | 12/1989 | Japan . |
| 2-235729 | 9/1990 | Japan ................... 264/1.1 |
| 5-177725 | 7/1993 | Japan . |
| 8-127077 | 5/1996 | Japan . |
| WO 89/02818 | 4/1989 | WIPO . |

OTHER PUBLICATIONS

Communication from European Patent Office and attached Search Report, dated May 28, 1998.

*Primary Examiner*—Mathieu D. Vargot
*Attorney, Agent, or Firm*—Merchant & Gould P.C.

[57] ABSTRACT

A method for making optical preforms of optical elements without residual stress or distortion is provided. In this method, an optical material is supplied between upper and lower molds. The upper mold has a plurality of recesses arranged in a predetermined pitch, and each recess corresponds to a first surface shape of the optical element. The lower mold has a plurality of recesses facing the recesses of the upper mold and each recess of the lower mold corresponds to a second surface shape of the optical element. The supplied optical material is pressed between the upper and lower molds to be a set of optical preforms. The set of optical preforms is processed by die punching or tool cutting to separate each optical preform from the set of optical preforms. Each optical preform is used for producing an optical element by further pressing. Alternatively, optical element can be formed directly by the press molding process.

27 Claims, 20 Drawing Sheets

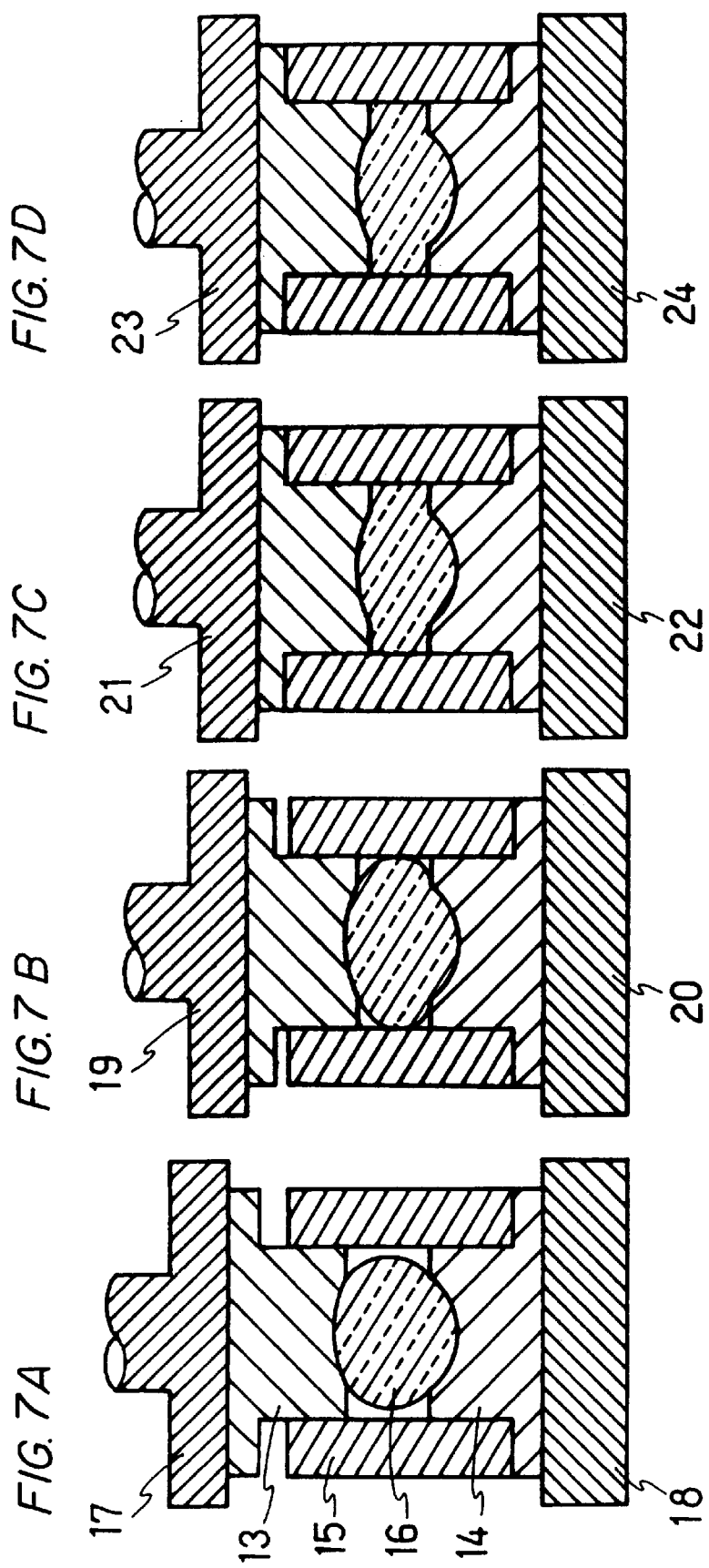

(PRIOR ART)

METHOD FOR MAKING OPTICAL PREFORMS AND OPTICAL ELEMENTS BY PRESS

BACKGROUND OF THE INVENTION

The present invention relates to a method for making optical elements such as lenses or prisms, and optical preforms of the optical elements, by press molding.

One example of a method for making such preforms in the prior art is disclosed in Japanese laid-open patent application (Tokkai Hei) 5-177725. This method uses injection molding of molten plastic pellets to make the optical preforms as explained below.

FIG. 17 shows a cross section of an injection molder used for making optical preforms in the prior art. Plastic pellets 51 are supplied into the hopper 50 and transferred to the heating cylinder 53. The plastic pellets are heated and melted by the heating cylinder 53 and the screw 54. Molten resin is injected from the tip nozzle 55 of the heating cylinder 53 into the mold 59, and reaches cavities 63 corresponding to an outer shape of an optical element through a sprue 60, runners 61 and gates 62. The temperature of the mold 59 is controlled at approximately softening temperature. In FIG. 17, numeral 52 is an injection cylinder, 56 is a fixing die plate, 57 is a moving die plate, and 58 is a closing cylinder.

The mold 59 is opened and a molded piece is taken out of the mold after the mold has been cooled. As seen in FIGS. 18A and 18B, the molded piece has a center sprue portion 64, and a plurality of runner portions 65 extend radially from the center sprue portion 64. At the tip of each runner portion 65, an optical preform 67 is connected via a gate portion 66. A plurality of optical performs 67 are obtained by separating them from the molded piece at the gates.

Optical preforms are pressed to make optical elements in such a way as explained below. FIG. 19 illustrates a section of a press mold and an optical element when the pressing is performed. Numeral 68 is an upper mold, 69 is a lower mold, and 70 is a drum mold. Numeral 71 is an optical element obtained by press molding, 72 is a part of press head having heating and pressing mechanisms, and 73 is a part of a press stage having a heating mechanism. FIG. 20 shows a process chart for pressing an optical preform to make an optical element using press molds mentioned above. In this chart, the temperature of the optical element is shown in (a), and the pressure given by the press head is shown in (b).

An optical preform made from an optical material (e.g., polycarbonate) by injection molding into a shape similar to an optical element is placed in a cavity defined by the upper, lower and drum molds 68, 69, 70. These molds are controlled at a temperature above the softening temperature and below the glass transition point. When the temperature of the optical preform goes up to a constant temperature between the softening temperature and the glass transition point as shown in (a) of FIG. 20, the press head 72 is forced downward such that the upper mold 68 gives the optical preform the pressure of approximately 100 kg/cm$^2$ for predetermined time. Then the pressure is released and the molds are cooled down to the softening temperature. After that, the upper mold is released and the pressed optical preform, i.e., the optical element 71 is taken out.

In the manufacturing process of optical preforms by injection molding in the prior art, surface sink, jetting, weld line or residual stress should be suppressed by controlling the conditions of injection molding. However, residual stress and distortion in the gate portion are difficult to eliminate completely by controlling the conditions of injection molding. Therefore, the optical preforms made by injection molding in the prior art have residual stress and distortion partially. It is difficult to make an optical element having good optical performance using such an optical preform having residual stress and distortion in the gate portion.

In addition, cost reduction in the process of making optical preforms by injection molding is difficult, because the number of products obtained in one shot is limited. Moreover, there is a difficulty in manufacturing smaller optical elements as the gate diameter has a lower limit due to a fluidity of the optical material.

Molds for a injection molder have a tendency to have a complicated structure for gaining a good fluidity of the optical material, and it is very expensive due to a labor cost for designing and trial manufacture of a proper mold structure. In addition, the wasted portion of the optical material in the injection mold is rather large. These disadvantages in the injection mold cause an extremely high cost for manufacturing optical preforms in the prior art.

SUMMARY OF THE INVENTION

An aim of this invention is to solve the problems in the prior art as mentioned above and to provide a method for manufacturing small optical preforms and optical elements without residual stress and distortion cheaply.

The method for making optical preforms of optical elements according to the present invention comprises steps of: supplying optical material between upper and lower molds, the upper mold having a plurality of recesses arranged in a predetermined pitch, each recess corresponding to a surface shape of the optical element, the lower mold having a plurality of recesses facing the recesses of the upper mold, each recess of the lower mold corresponding to an opposite surface shape of the optical element; pressing the optical material to form a set of optical preforms; and separating each optical preform from the set of optical preforms.

According to the method mentioned above for making a plurality of optical elements at one time by press molding, the obtained optical preforms have no gate portion such as exists in the preforms made by injection molding. Therefore, optical preforms without residual stress and distortion can be made cheaply by the method of the present invention. Optical elements made of these preforms have good optical properties without residual stress and distortion. The method of the present invention has other advantages. A structure of a press mold that needs no gate is simpler than that of the injection mold. The molding condition is also simpler in the press molding. Smaller optical elements can be made by the method of the present invention because the press mold needs no gate. Furthermore, the waste of optical material is less in the method of the present invention than in the injection molding.

The optical material supplied between the upper and lower molds may be a blank made by injection molding. It is preferable to supply a plate material. It is also preferable to heat an optical material to be supplied between the upper and lower molds up to a temperature over the glass transition point of the optical material. Alternatively, a molten material may be supplied between the upper and lower molds. The optical material is preferably a plastic material.

It is preferable for mass production that the step of separating each optical preform from the set of optical preforms includes die punching. Alternatively, the step may include cutting with a rotating tool.

A first method for making optical elements according to the present invention includes a step of pressing the optical preform made by the method explained above. This step preferably includes heating the preform up to a temperature over the glass transition point to press the preform and cooling the preform down to a temperature under the softening temperature while further pressing the preform. A good optical element without residual stress and distortion can be obtained by the press molding method explained above.

A second method for making optical elements according to the present invention is direct press molding of an optical material to make an optical element. Similar steps and molds can be used in this method as in those for making optical preforms. However, more precise control of temperature and pressure is necessary in this direct press molding method than in the method for molding the preform that is an intermediate product. It is also necessary to take more time for pressing the optical material directly into the optical element that is a final product.

A press mold for manufacturing optical preforms or optical elements according to the present invention comprises an upper mold having a plurality of recesses arranged in a predetermined pitch, each recess corresponding to a surface shape of the optical element; and a lower mold having a plurality of recesses facing the recesses of the upper mold, each recess of the lower mold corresponding to an opposite surface shape of the optical element. Using the press mold according to the present invention provides a plurality of optical preforms or optical elements in one press, and contribute to cost reduction for the optical element.

It is preferable that at least one of the upper and lower molds are made of porous metal. The mold made of porous metal can let the air go out of the cavity defined by the recess of the mold and the surface of the optical material so that the optical material changed in shape under heat and pressure can enter the recess of the mold completely. Thus, formation of a defective mold portion is suppressed.

It is more preferable that at least one of the upper and lower molds comprise a plurality of inner molds made of porous metal having the recess and a main mold receiving the inner molds arranged in a predetermined pitch. The mold structure using a plurality of inner molds makes maintenance of the press mold easier because only the damaged inner mold must be replaced when one of recesses is damaged, for example. The press mold comprising a plurality of inner molds made of porous metal and a main mold made of normal metal has other advantages concerning mechanical strength and cost compared with the press mold whose whole body is made of porous metal.

In an alternative construction, at least one of the upper and lower molds may comprise a plurality of inner molds made of glass having the recess and a main mold receiving the inner molds arranged in a predetermined pitch. For example, a flint glass is suitable for a material of a mold in view of its waterproof and acid-proof property. This material is also good for making many identical inner molds easily by molding with a mother mold.

BRIEF DESCRIPTION OF THE DRAWINGS

In the accompanying drawings:

FIGS. 7(a–d) show a cross section of a press mold and an optical preform showing a pressing step of an optical preform to make an optical element;

DETAILED DESCRIPTION OF THE PREFERRED EMBODIMENTS

[First Embodiment]

A method for making an optical preform of an optical element according to the present invention comprises a step of manufacturing a set of optical preforms that includes a plurality of optical preforms combined together, and a step of separating each optical preform from the set of optical preforms.

Figure 1A:
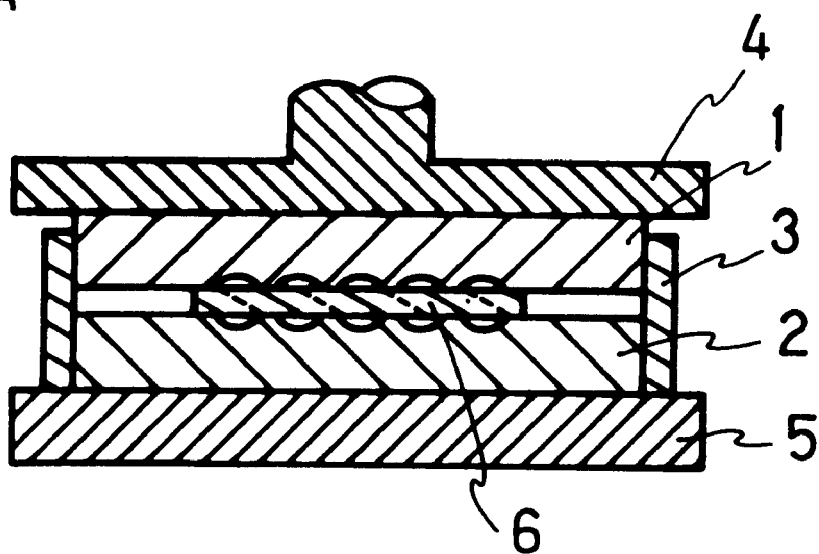
FIGS. 1(a) and 1(b) show a cross section of a press mold and an optical material showing a pressing step of a first embodiment for making optical preforms according to the present invention.
Figure 1B:
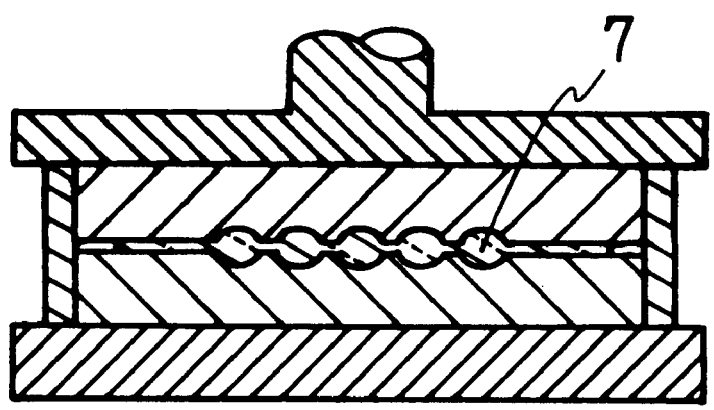

FIGS. 1(a) and 1(b) show a cross section of a press mold and an optical material in the step of manufacturing the set of optical preforms by press molding. The state before the optical material is changed in shape is illustrated in (a), and the state after the optical material is changed in shape to be the set of optical preforms is illustrated in (b). This press mold comprises an upper mold 1, a lower mold 2, a drum mold 3. Numeral 4 is a press head having a heating and pressing mechanism, and numeral 5 is a press stage having a heating mechanism. These mechanisms may be any mechanisms known well in the art. An optical material 6 supplied between the upper mold 1 and the lower mold 2 is pressed to become a set of optical preforms 7.

In an example, a polyolefin resin was used as the optical material 6 that has a glass transition point Tg of 140 degrees centigrade and a softening temperature Tt of 123 degrees centigrade. A block of the polyolefin resin was cut into a plate (30 mm×30 mm×1.7 mm) and provided to the press mold. The upper and lower molds of the press mold were made of a porous metal that is a ferritic stainless steel having an average pore diameter of 3–7 micron, a porosity of 25%, and a density of 6.0–6.2 g/cm$^3$. The dimension of the upper and lower molds were 50 mm×50 mm×15 mm.

Figure 2A:
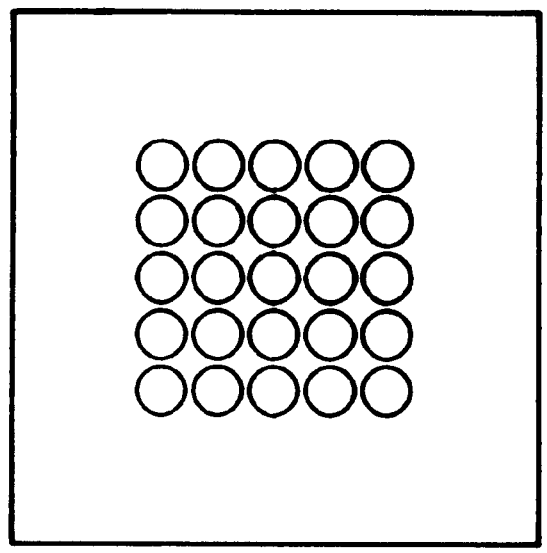
FIG. 2A is a plan view of a lower mold of the press mold shown in FIGS. 1(a) and 1(b)
Figure 2B:
FIG. 2B is a cross section of a lower mold of the press mold shown in FIGS. 1(a) and 1(b)

The optical preform to be obtained in this example was a preform of a convex lens having curvature radii R1, R2=2.5 mm, an outer diameter of 4.5 mm and a center thickness of 3.25 mm. The upper mold 1 and the lower mold 2 have twenty-five recesses arranged in a 5×5 matrix by 6 mm pitch on each surface, and the shape of each recess corresponds to a curved surface R1 or R2 of the optical element. A plan view and a cross section of the lower mold are illustrated in FIGS. 2A and 2B.

The drum mold 3 is necessary for registration of the upper and lower molds, and for adjustment of the thickness of the obtained preforms. In an example, a clearance between the upper or lower mold 1, 2 and the drum mold 3 was set at approximately 5 microns. The drum mold was made of a stainless steel.

The heating mechanisms of the press head 4 and the press stage 5 heat the optical material 6 up to the temperature over the softening temperature of the material. The shape of the optical material can be changed at the temperature over the softening temperature. However, it is preferable to heat the optical material up to the temperature over the glass transition point in order to make the press molding easier and to suppress distortion of the obtained optical preform. In an example, the temperature of the press head 4 and the press stage 5 was controlled at 200 degrees centigrade so that the temperature of the optical material 6 reaches 180 degrees centigrade, which is over the glass transition point, in approximately 5 minutes.

When the optical material 6 reaches 180 degrees centigrade, the press head is forced downward such that the upper mold 1 applies pressure to the optical material 6 and changes the shape of the optical material 6. Press molding was performed approximately for 3 minutes until the lower side of the press head 4 contacts the drum mold 3 as shown in (b) of FIG. 1.

Figure 3A:
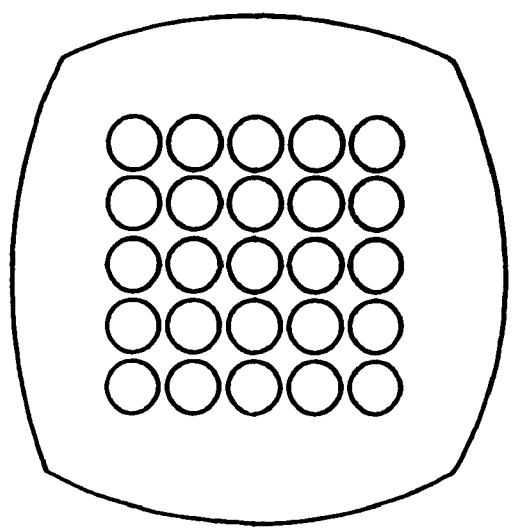
FIG. 3A is a plan view of a set of optical preforms obtained by the pressing step shown in FIGS. 1(a) and 1(b)
Figure 3B:
FIG. 3B is a cross section of a set of optical preforms obtained by the pressing step shown in FIGS. 1(a) and 1(b)

After the press molding had been finished, heating of the press head 4 and the press stage 5 was stopped, and they were cooled down to the temperature of 110 degrees centigrade, which is under the softening temperature of the material, so as to prevent the set of optical preforms 7 from deforming when being taken out of the press mold. Then the press head 4 was released, and the set of optical preforms 7 was taken out. A plan view and a cross section of the obtained set of optical preforms are illustrated in FIGS. 3A and 3B.

There is a possibility that the air enclosed in the cavity defined by the recess of the upper or lower mold 1, 2 and the surface of the plate of optical material prevents the optical material from entering the cavity when the shape of the material is changed by pressing force. However, in this embodiment, the air enclosed in the cavity can go out through continuous micro pores distributed in the whole porous metal that the upper and lower molds 1, 2 are made of. Thus the optical material 6 can enter the cavity, i.e., the recess of the upper and lower mold 1, 2, completely to be molded along the inner surface of the recess.

Figure 4A:
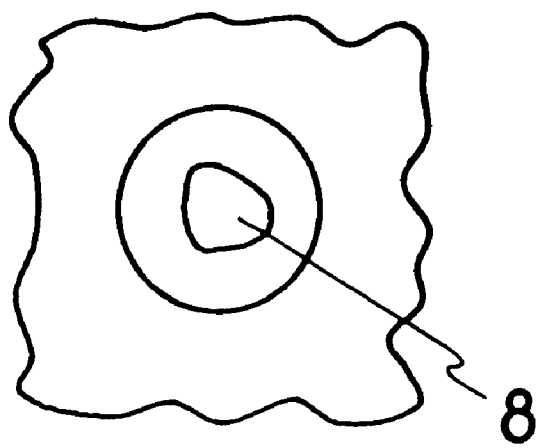
FIG. 4A is a plan view of a defective mold portion that may appear in the set of optical preforms due to an enclosed air pocket in a cavity defined by the recess of the mold and the surface of the optical material.
Figure 4B:
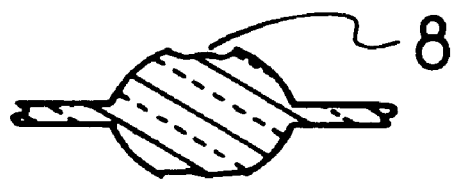
FIG. 4B is a cross section of a defective mold portion that may appear in the set of optical preforms due to an enclosed air pocket in a cavity defined by the recess of the mold and the surface of the optical material.

In a reference example where the upper and lower mold 1, 2 were made of a normal stainless steel, defective mold portions due to the air enclosed in the cavity appeared as shown in FIGS. 4A and 4B. There were defective mold portions observed in almost half of twenty-five optical preform portions of the set of optical preforms 7.

Figure 5A:
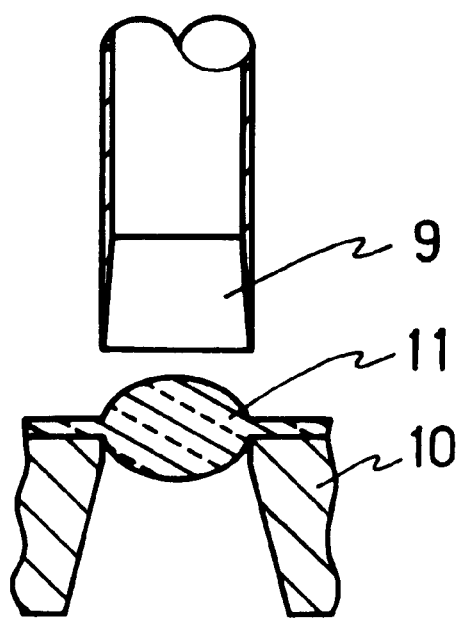
FIGS. 5(a) and 5(b) show a cross section showing a step of separating each optical preform from the set of optical preforms shown in FIGS. 3(a) and 3(b) by die punching.
Figure 5B:
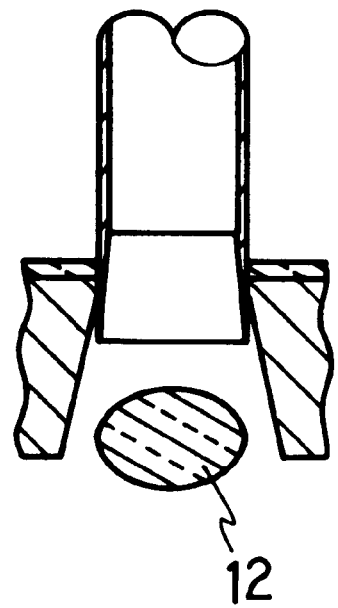

The set of optical preforms is then processed to separate each preform from the set of optical preforms in the next step. FIGS. 5(a) and 5(b) show the step of separating each preform from the set of optical preforms by die punching. The state before punching is illustrated in (a), and the state after punching is illustrated in (b). The set of optical preforms 11 is placed on a die 10, and a punch 9 is forced downward to separate single optical preform 12. Outer profiles and dimensions of the punch and the die are selected according to the outer shape and dimension of the optical preform 12 to be obtained.

In an example, a chip of the punch was ring-shaped with an inner diameter of 4.51 mm and an edge angle of 10 degrees in order to obtain optical preforms with an outer diameter of 4.5 mm. There was a clearance of 10 microns between the outer diameter of the punch and the inner diameter of the die. The punch 9 and the die 10 were made of a hardened steel.

Location of the set of preforms on the die is performed by fitting a convex portion (i.e., portion corresponding to each optical preform) of the set of optical preforms into a hole of the die 10 as illustrated in (a) of FIG. 5. It may be preferable to provide particular means for precise registration of the set of preforms on the die.

Figure 6A:
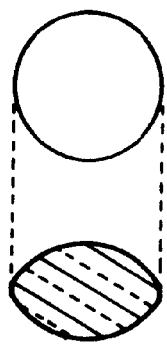
FIG. 6A illustrates a shape of the optical preform obtained by the separating step shown in FIGS. 5(a) and 5(b)
Figure 6B:
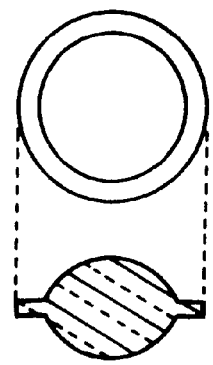
FIGS. 6B and 6C illustrate other shapes of the optical preforms that can be obtained by die punching.
Figure 6C:
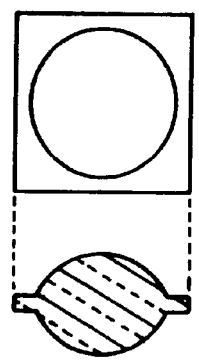

By forcing the punch downward, each optical preform is cut from the set of preforms as illustrated in (b) of FIG. 5. The shape of the obtained optical preform (plane view and section) is illustrated in FIG. 6A. Other shapes of the optical preforms shown in FIGS. 6B or 6C can be obtained by changing the profile or the dimension of the punch and die.

Each preform obtained by the press molding and separating steps explained above is further pressed in the next step to make a final product, an optical element. FIGS. 7(a–d) show the pressing step of the preform, including four sectional of a press mold and a preform showing the changes in shape sequentially. First state (a) is a heat process; second state (b) is a prepress process; third state (c) is a main press process; and fourth state (d) is a cool process. The press mold comprises an upper mold 13, a lower mold 14 and a drum mold 15. Numeral 16 is an optical preform; numeral 17 is a first press head; numeral 18 is a first press stage; numeral 19 is a second press head; numeral 20 is a second press stage; numeral 21 is a third press head; numeral 22 is a third press stage; numeral 23 is a fourth press head; and numeral 24 is a fourth press stage.

The optical preform 16 obtained by the step explained above is placed in the cavity defined by the upper mold 13, lower mold 14 and the drum mold 15. The inner surfaces of these molds have shapes corresponding to the outer surface of the optical element to be obtained. Then, the unit of the upper mold 13, the lower mold 14 and the drum mold 15 containing the optical preform 16 is placed between the first press stage 18 and the first press head 17. The first press stage 18 and the first press head 17 are controlled at an adequate temperature so that the temperature of the optical preform 16 goes up to the desired temperature of 180 degrees centigrade in 45 seconds.

In an example, the upper mold 13, the lower mold 14 and the drum mold 15 were made of a hard metal, and inner surfaces of the upper and lower molds were coated with a noble metal. Of course, it is possible to make these molds using other materials such as stainless steel.

Then the unit of the upper mold 13, the lower mold 14 and the drum mold 15 containing the optical preform 16 is transferred to the position between the second press stage 20 and the second press head 19 as shown in (b) of FIG. 7. The second press stage 20 and the second press head 19 are controlled at an adequate temperature so that the temperature of the optical preform 16 goes up to the desired temperature of 200 degrees centigrade in 45 seconds. The optical preform 16 is changed in shape by the pressure of the second press head 20. In an example, 80% of the total change amount was performed in this prepress process.

Then the unit of the upper mold 13, the lower mold 14 and the drum mold 15 containing the optical preform 16 is transferred to the position between the third press stage 22 and the third press head 21 as shown in (c) of FIG. 7. The third press stage 22 and the third press head 21 are controlled at an adequate temperature so that the optical preform 16 is cooled down to the desired temperature of 120 degrees centigrade in 45 seconds. The optical preform 16 is cooled down to the softening temperature from the temperature over the glass transition point while the optical preform is pressed by a pressure from the third press head. This pressure was set at 5.0 Kgf/cm$^2$ in an example.

Then the unit of the upper mold 13, the lower mold 14 and the drum mold 15 containing the optical preform 16 is transferred to the position between the fourth press stage 24 and the fourth press head 23 as shown in (d) of FIG. 7. The fourth press stage 24 and the fourth press head 23 are controlled at an adequate temperature so that the optical preform 16 is cooled down to the desired temperature of 90 degrees centigrade in 45 seconds.

The pressed optical preform having the final profile, i.e., the optical element is taken out after the upper mold 13 is removed at the final process.

The optical element obtained by press molding from the optical material via the optical preform according to the present invention showed good properties as it has no portion such as gate portion in the injection-molded preform of the prior art that contains residual stress and distortion.

In this embodiment, the die punching for separation of the optical preform is performed one by one. However, it is preferable to punch plural preforms at one time by arranging plural punches and dies in a predetermined pitch. The material of the punch and die is not limited to the hardened steel. Other hardened material such as a sintered hard alloy or a ceramic can be used for making the punch and die as they are resistant to deformation or wear.

Instead of the drum mold for registration of the upper and lower mold, and for adjustment of the thickness of the obtained preforms in this embodiment, other means may be used. For example, a position sensor can be used for detecting a lowering position so that the thickness of the obtained optical preforms can be controlled.

In order to press the optical preforms efficiently, it is useful to provide a plurality of recesses corresponding to the profile of the optical element in the upper and lower mold so that a plurality of optical preforms are pressed to be optical elements at a time. The profile of the optical element is not limited to a spherical surface, but may be an other curved or flat surface.

In this embodiment explained above, an optical material is pressed to make an optical preform, and the optical preform is further pressed to make an optical element that is a final product. However, it is also possible to make an optical element directly from an optical material by similar press molding to the method for making an optical preform. This direct press molding requires more precise control of temperature and pressure as well as longer time for molding compared with the two-stage molding via optical preforms.

[Second Embodiment]

FIGS. 8(*a*) and 8(*b*) illustrate a cross section of a press mold and an optical material showing another embodiment of the present invention. The state before the optical material is changed in shape is illustrated in (a), and the state after the optical material is changed in shape to be the set of optical preforms is illustrated in (b). This press mold comprises an upper mold 25 and a lower mold 26. Numeral 27 is a press head having a heating and pressing mechanism as well as a descent control mechanism, numeral 28 is a press stage having a heating mechanism, numeral 29 is an optical material, numeral 30 is a set of optical preforms, that is an optical material after press molding. The upper and lower molds 25, 26 are fixed to the press head and the press stage 27, 28 with little misregistration.

Figure 9A:
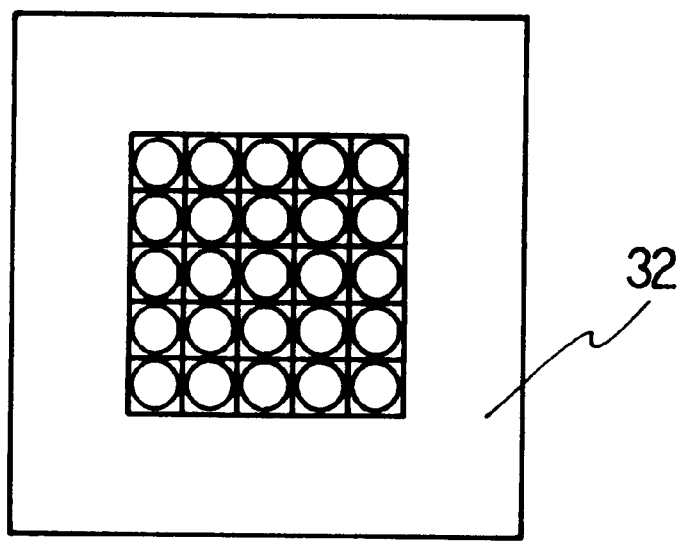
FIG. 9A is a plan view of a lower mold of the press mold shown in FIGS. 8(a) and 8(b)
Figure 9B:
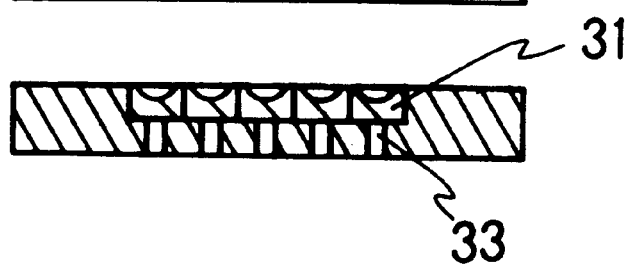
FIG. 9B is a cross section of a lower mold of the press mold shown in FIGS. 8(a) and 8(b)

FIGS. 9A and 9B are a plan view and a cross section showing a structure of the lower mold 26 that includes a plurality of inner molds 31 and a main mold 32 having a recess for receiving the plurality of inner molds 31 arranged in a predetermined pitch. The main mold also has a plurality of through holes 33 arranged in the bottom of the recess. The upper mold has the same structure explained above, too.

In an example, the inner molds 31 were made of a porous metal that is a ferritic stainless steel having an average pore diameter of 3–7 micron, a porosity of 25%, and a density of 6.0–6.2 g/cm$^3$. Each inner mold had a dimension of 6 mm×6 mm×7 mm. The main mold 32 was made of a stainless steel, and had a dimension of 50 mm×50 mm×15 mm. A recess was formed in the main mold for receiving twenty-five inner molds arranged in a 5×5 matrix. Twenty-five through holes were also formed in the bottom of the recess. Each through hole had an inner diameter of 3 mm and was located corresponding to one of the inner molds.

As an example of the optical material supplied between the upper and lower molds, a polycarbonate was used that has a glass transition point of Tg=150 degrees centigrade and a softening temperature Tt=140 degrees centigrade. The material was injection-molded into a plate having a dimension of 200 mm×300 mm×4 mm, and was cut into a dimension of 28 mm×28 mm by laser cutting before being supplied between the upper and lower molds.

Figure 12A:
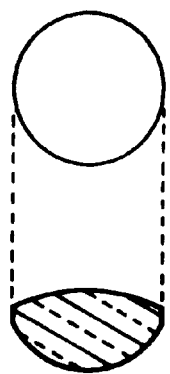
FIG. 12A illustrates a shape of the optical preform obtained by the separating step shown in FIGS. 11(a) and 11(b)

The optical preform to be obtained in this example had a profile shown in FIG. 12A and a dimension of R1=2.5 mm, R2=4.0 mm, outer diameter=4.6 mm and center thickness= 3.3 mm. Each inner mold placed in the upper mold has a recess with a spherical inner surface of R2=4.0 mm, and each inner mold placed in the lower mold has a recess with a spherical inner surface of R1=2.5 mm.

The reason of that the inner molds were made of a porous metal is same as for the previous embodiment, that is for permitting the air in the cavity defined by the recess of the upper or lower mold and the surface of the optical material to go out. Thus the optical material can enter the cavity completely, driving out the air. The air can go out though continuous micro pores in the inner mold and through hole 33 provided in the main mold 32.

Figure 8A:
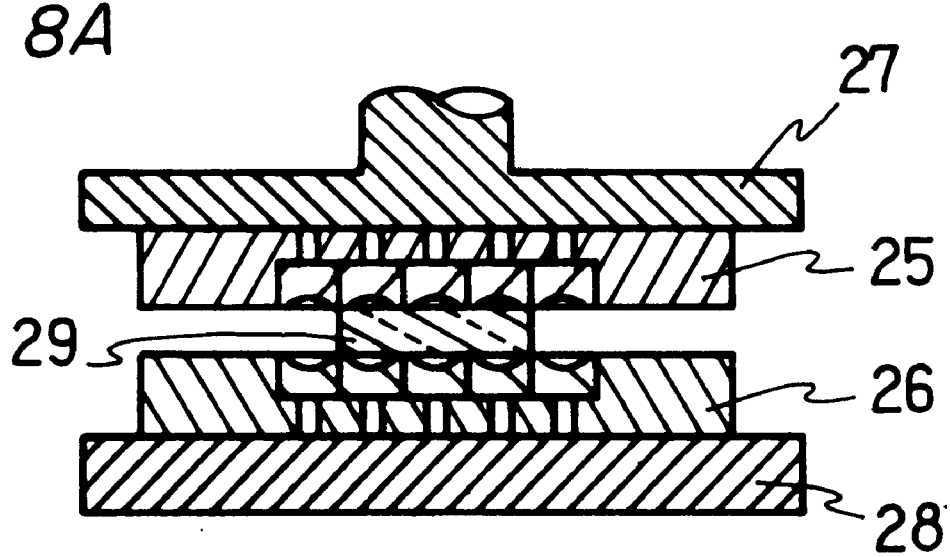
FIGS. 8(a) and 8(b) show a cross section of a press mold and an optical material showing a pressing step of a second embodiment for making optical preforms according to the present invention.
Figure 8B:
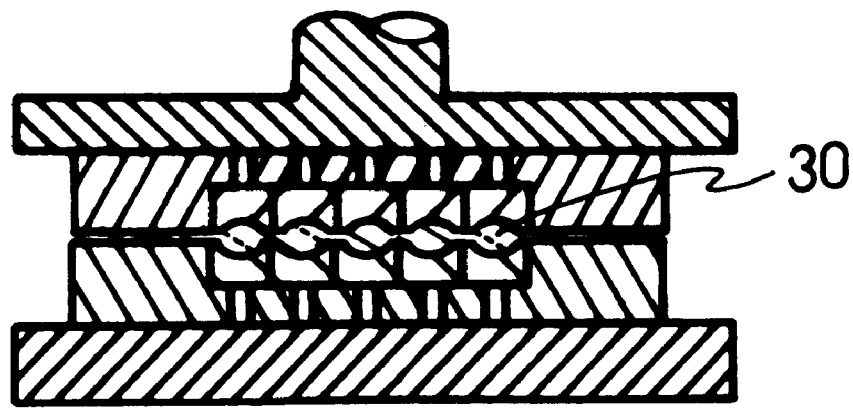
Figure 10A:
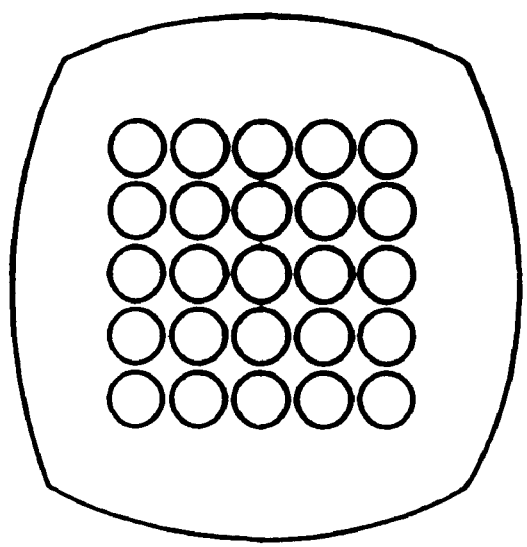
FIG. 10A is a plan view of a set of optical preforms obtained by pressing step shown in FIGS. 8(a) and 8(b)
Figure 10B:
FIG. 10B is a cross section of a set of optical preforms obtained by pressing step shown in FIG. 8(a) and 8(b)

The press head 27 and the press stage 28 in FIGS. 8(a) and 8(b) were controlled at the predetermined temperature for heating the optical material 29 placed between the upper mold 25 and the lower mold 26 to the temperature of 180 degrees centigrade in about three minutes. In this temperature, the optical material can be changed in shape. After the optical material had reached the temperature, the press head 27 and the upper mold 25 were forced downward to press the optical material 29 and changed its shape. The change amount in shape was adjusted by controlling the descent of the press head. After the predetermined amount of change in shape was completed, the press-molded optical material 30 was cooled down to the temperature of 130 degrees centigrade, under the softning temperature. Then the press head 27 was raised to release the upper mold 25 for taking out the press-molded optical material, i.e., a set of optical preforms 30. A plane view and a cross section of the set of optical preforms 30 are shown in FIGS. 10A and 10B.

Figure 11A:
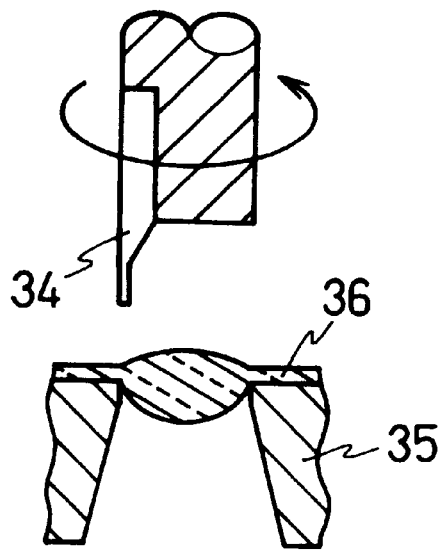
FIGS. 11(a) and 11(b) show a cross section showing a step of separating each optical preform from the set of optical preforms shown in FIGS. 10A and 10B by a rotating tool.
Figure 11B:
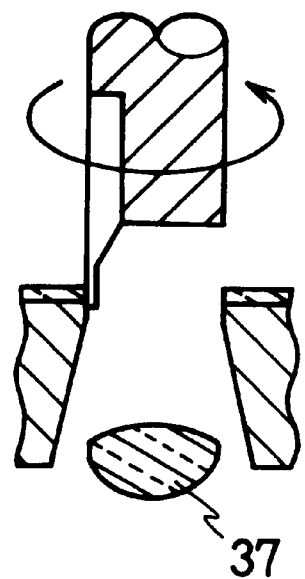

The set of optical preforms 30 is then separated into each preform in the next step. FIGS. 11(a) and 11(b) the step of separating each preform from the set of optical preforms by using a rotating tool in a cross section. A state before separation is illustrated in (a), and a state after separation is illustrated in (b). Numeral 34 is a rotating tool, numeral 35 is a die on which a set of optical preforms is placed, numeral 36 is the set of optical preforms, and 37 is a separated optical preform. The tool 34 was made of a high speed steel. A hardened metal can also be used for the tool. The tool is driven as shown by an arrow in FIGS. 11(a) and 11(b).

A set of optical material 36 is placed on the die 35 with registration as shown in (a) of FIG. 11. Then the tool is forced downward, rotating at 250 r.p.m. A trace of the tool's tip separates an optical preform 37 in a round shape from the set of optical preforms as shown in (b) of FIG. 11. The trace of the tool's tip defines the outer diameter (4.6 mm) of the optical preform.

The optical preform obtained by this embodiment of the present invention has no portion such as gate portion in the injection-molded preform of the prior art. Therefore, an optical element made of this preform showed good properties without residual stress or distortion.

One of the merits of this embodiment where the press mold comprises a plurality of inner molds is that maintenance of the mold is easy because each inner mold can be replaceable. When one of the recesses is broken, the mold is repaired easily by replacing one of the inner mold having the broken recess. The inner mold can have two or more recesses instead of a single recess corresponding to the profile of the optical element.

It is also possible to make different shape of optical preforms at one press molding by using a mold that has different shape of recesses. In this case, it is advantageous to use a press mold having a plurality of inner mold such as in this embodiment.

An optical material supplied between the upper and lower molds is not limited to a plate material but may be another shape such as a spherical surface. It is also possible to supply directly pellets of plastic resin when it is suitable for the shape and size of an optical preform to be obtained.

Figure 12B:
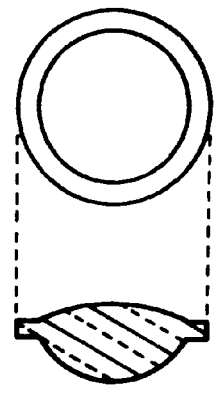
FIGS. 12B and 12C illustrate other shapes of the optical preforms that can be obtained by a rotating tool.
Figure 12C:
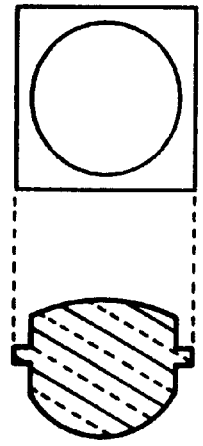

Other methods such as a laser cutting, ultrasonic machining or water-jet cutting can be used instead of tool cutting for separating the optical preforms from the set of optical preforms. The shape of the obtained optical preform is not limited to FIG. 12A but may be shapes shown in FIG. 12B or 12C. The shape shown in FIG. 12B had an advantage in that the positioning accuracy for cutting can be rough since a weight of a cut optical preform does not change even if the positioning accuracy is not good enough.

[Third Embodiment]

Figure 13A:
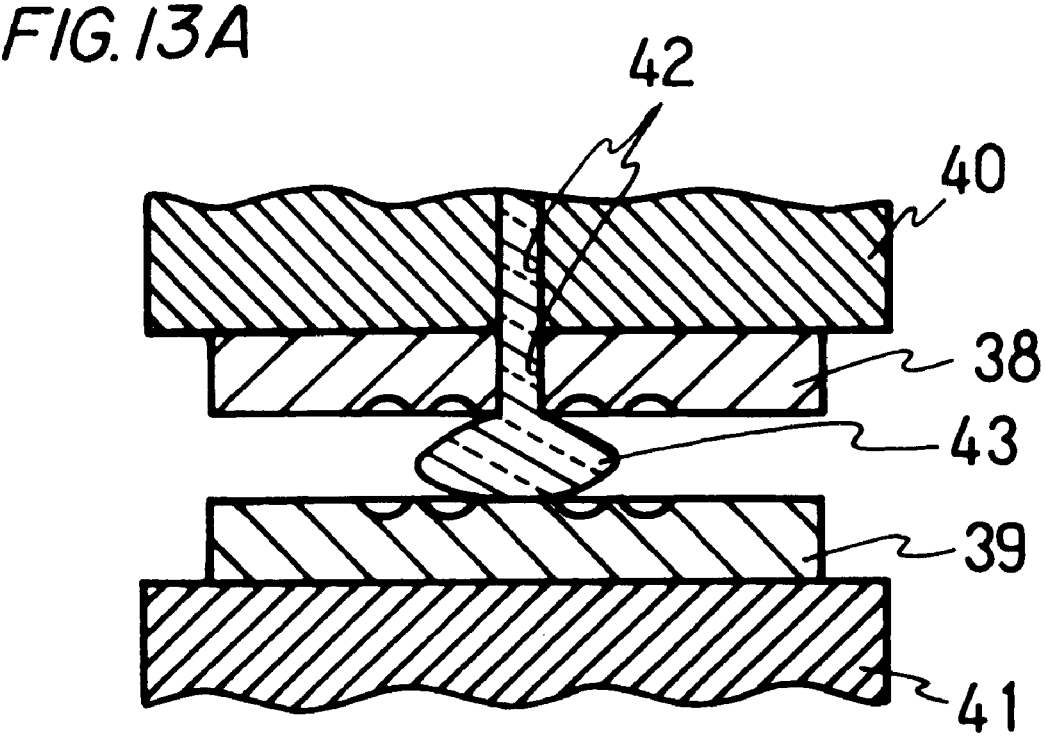
FIGS. 13(a) and 13(b) show a cross section of a press mold and an optical material showing a pressing step of a third embodiment for making optical preforms according to the present invention.
Figure 13B:
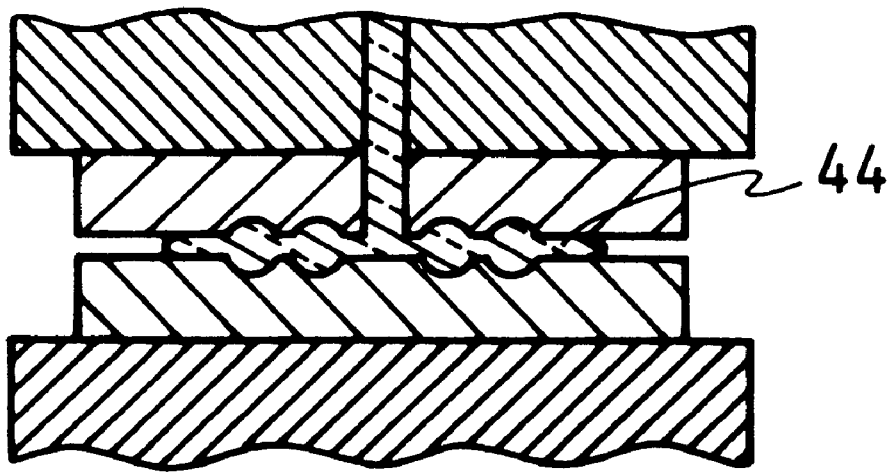

FIGS. 13(a) and 13(b) illustrate a cross section of a press mold and an optical material showing a third embodiment of the present invention. A state before the optical material is changed in shape is illustrated in (a), and a state after the optical material is changed in shape to be a set of optical preforms is illustrated in (b). This press mold comprises an upper mold 38 and a lower mold 39. Numeral 40 is a press head having a heating and pressing mechanism as well as a descent control mechanism, and numeral 41 is a press stage having a heating mechanism. The upper and lower molds 38, 39 were fixed to the press head 40 and the press stage 41 such that there was no misregistration between both molds. The press head 40 and the upper mold 38 have a conduit 42 passing through them at their center portion for supplying the molten optical material 43. Numeral 44 is an optical material after press molding to be a set of optical preform.

Figure 16:
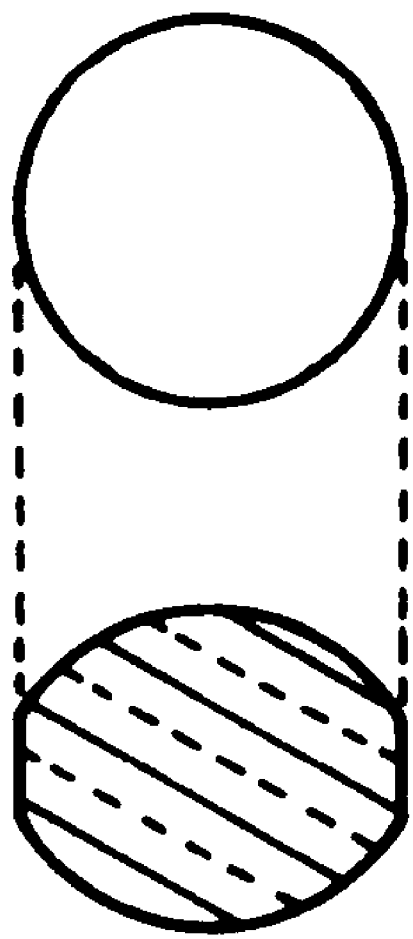
FIG. 16 illustrates a shape of the optical preform obtained by the separating step shown in FIGS. 15(a) and 15(b)
Figure 17:
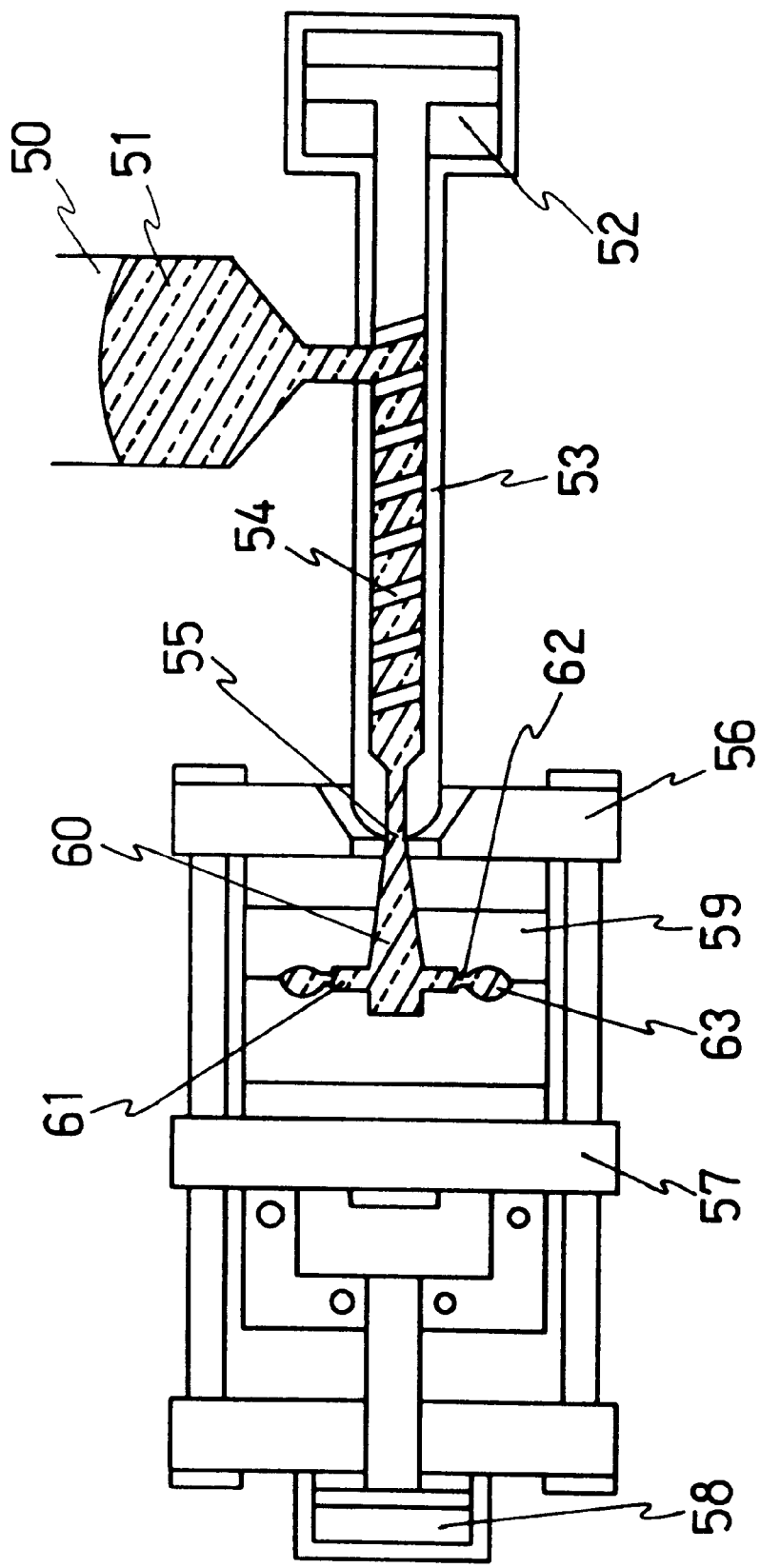
FIG. 17 is a cross section of an injection molder used for making optical preforms in the prior art.
Figure 18A:
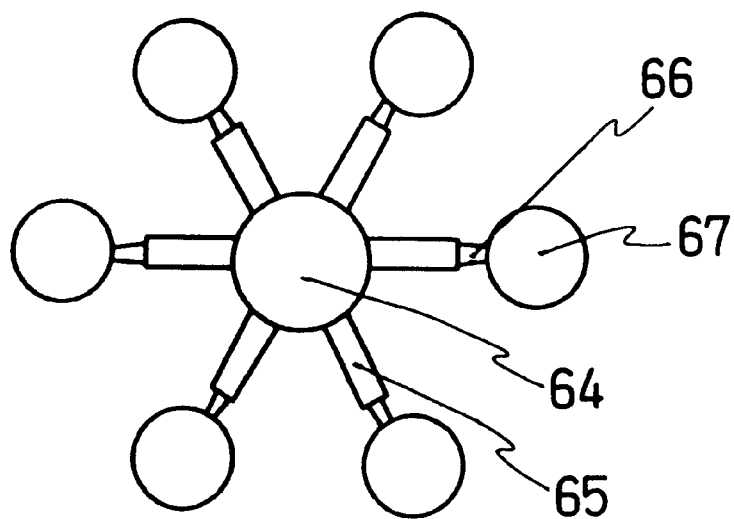
FIG. 18A is a plan view of a molded piece obtained by the injection molder shown in FIG. 17.
Figure 18B:
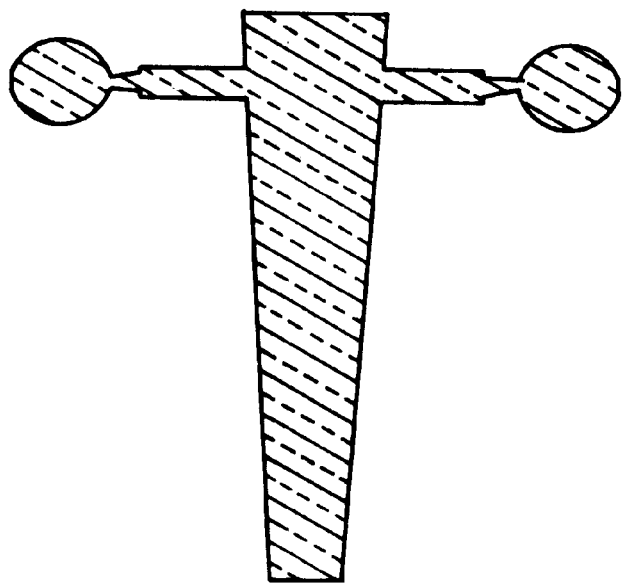
FIG. 18B is a cross section of a molded piece obtained by the injection molder shown in FIG. 17.
Figure 19:
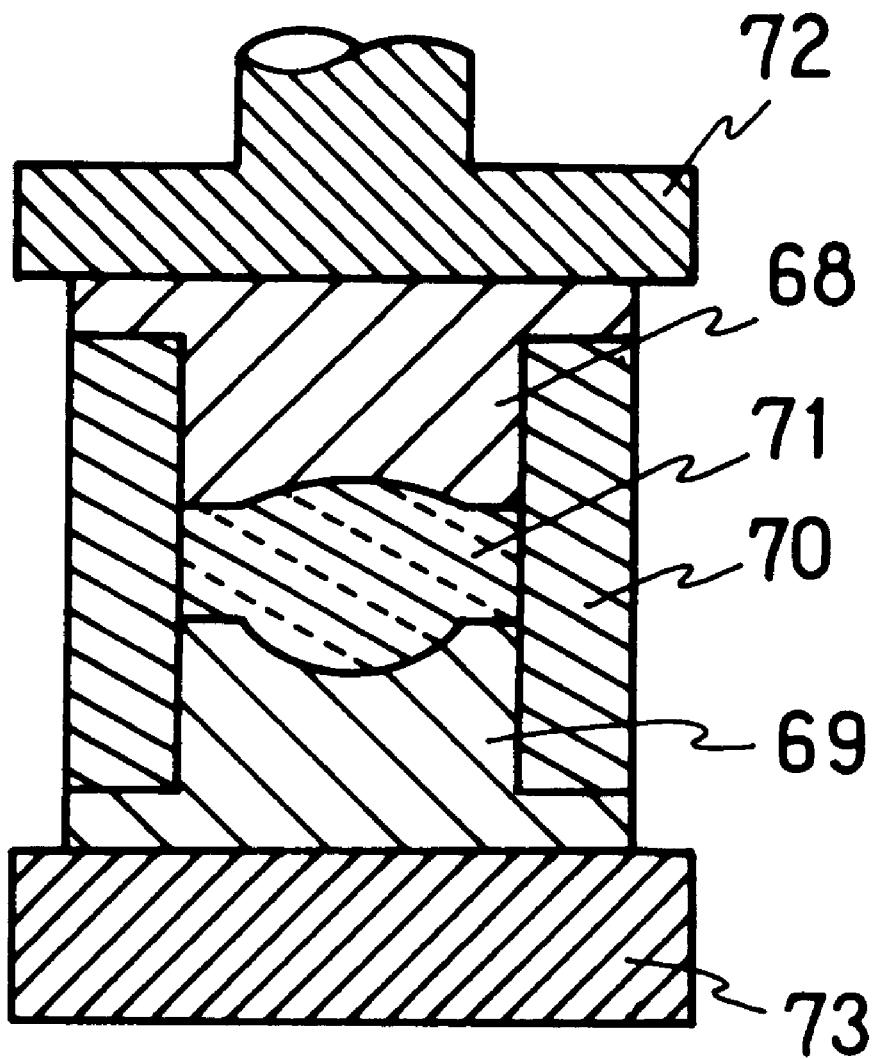
FIG. 19 is a cross section of a press mold and an optical preform showing a pressing step of an optical preform to make an optical element in the prior art.
Figure 20A:
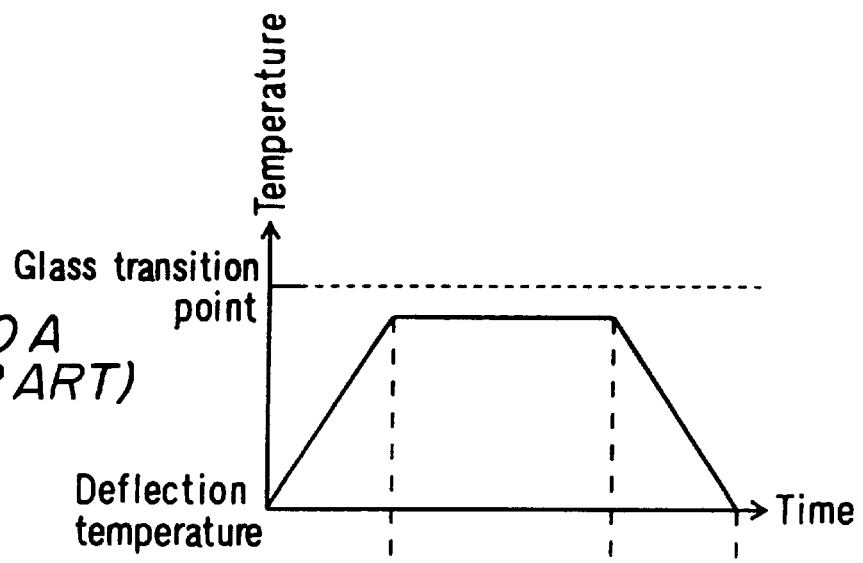
FIG. 20 is a process chart of the pressing step shown in FIG. 19.
Figure 20B:
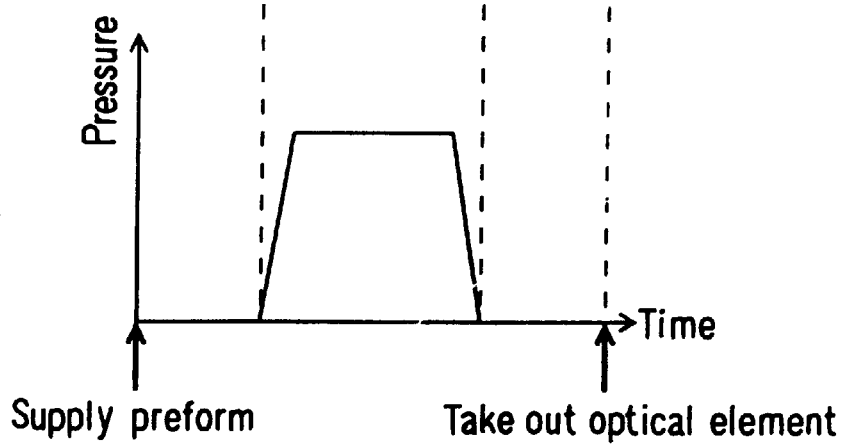

In an example, the optical preform to be obtained has a profile shown in FIG. 16. Its curvature radii R1 and R2 are 2.0 mm; its outer diameter is 3.8 mm; and its center thickness is 4.49 mm. The upper and lower molds 38, 39 were made of the same porous metal as in the first embodiment. The conduit 42 provided in the press head 40 and the upper mold 38 has an inner diameter of 4.5 mm. A polyolefin resin was used as the optical material 43 supplied through the conduit 42.

The upper mold 38 and the lower mold 39 have recesses on each surface, each recess having a spherical inner surface of R1=R2=2.0 mm, and arranged in a 5×5 matrix on 6 mm pitch. However, the center portions of the upper and lower molds 38, 39 have no recess because there is the conduit 42 for supplying the optical material at the center portion of the upper mold 38. Therefore, there are twenty-four recesses in the upper and lower molds 38, 39 respectively.

In this embodiment, a predetermined amount of molten optical material 43 is supplied between the upper and lower molds 38, 39 through the conduit 42 as shown in (a) of FIG. 13. The upper and lower molds 38, 39 are controlled at the temperature of 150 degrees centigrade by the press head 40 and the press stage 41 with heat mechanisms.

When the predetermined amount of molten optical material has been supplied, the press head moves downward to press the optical material. There is a mechanism for preventing the optical material between the upper and lower molds 38, 39 from flowing back through the conduit 42. The descent distance of the press head 40 is controlled by the descent control mechanism.

Figure 14A:
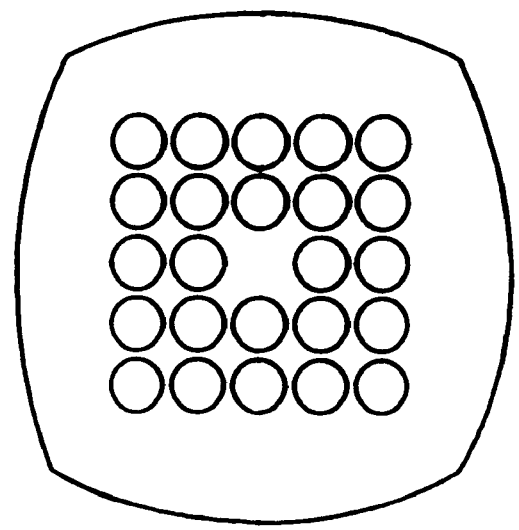
FIG. 14A is a plan view of a set of optical preforms obtained by pressing step shown in FIGS. 13(a) and 13(b)
Figure 14B:
FIG. 14B is a cross section of a set of optical preforms obtained by pressing step shown in FIGS. 13(a) and 13(b)

After the predetermined amount of pressing is finished, the upper and lower molds 38, 39 are cooled by the press head 40 and the press stage 41, and the optical material is cooled down to the temperature of 90 degrees centigrade, that is below the softening temperature. Then the pressed optical material, that is a set of optical preforms 44 is taken out. A plan view and a cross section of the obtained set of optical preforms 44 are shown in FIG. 14A and FIG. 14B.

Figure 15A:
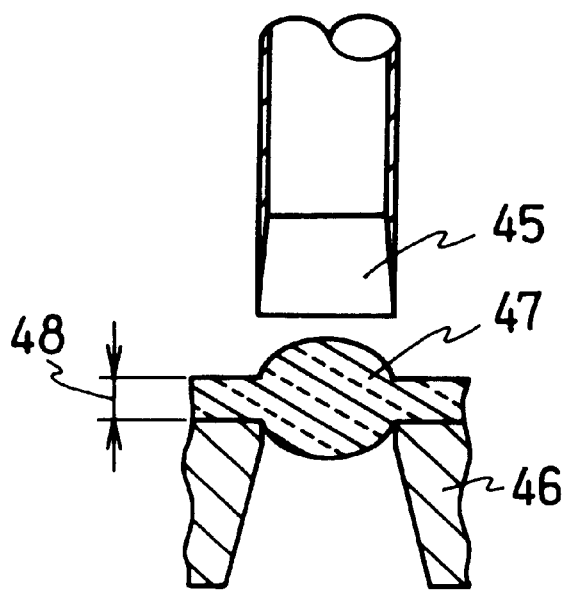
FIGS. 15(a) and 15(b) show a cross section showing a step of separating each optical preform from the set of optical preforms shown in FIGS. 14A and 14B by die punching.
Figure 15B:
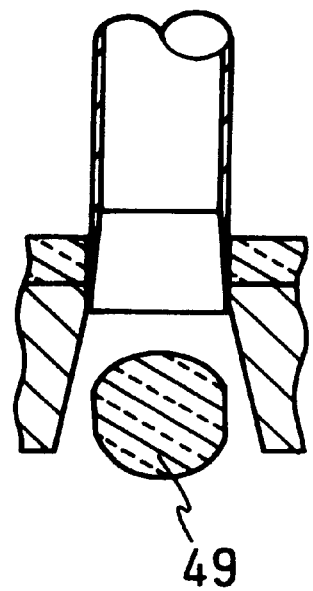

Then, the set of optical preforms 44 is processed to separate each preform from the set of optical preforms by die punching as illustrated in FIGS. 15(a) and 15(b). A state before punching is illustrated in (a), and a state after punching is illustrated in (b). Numeral 45 is a punch, numeral 46 is a die, numeral 47 is a set of optical preforms, and numeral 49 is a separated preform. The punch 45 in this embodiment has a heating mechanism. Profiles and sizes of the punch and die 45, 46 are selected according to the outer shape of the optical preform to be punched.

In an example, the tip of the punch was a ring shape with an inner diameter of 3.83 mm and the tip angle was 10 degrees so that the outer diameter of the punched preform was 3.8 mm. A clearance between the outer diameter of the die and the inner diameter of the punch was 30 microns. The punch 45 and the die 46 were made of a sintered hard alloy.

The set of optical preforms is placed on the die 46 with registration as shown in (a) of FIG. 15. Then the punch 45, which is heated to the temperature of 140 degrees centigrade by the heating mechanism, is forced downward to punch the optical preform 49 as shown in (b) of FIG. 15. The merit of punching with the heated punch 45 is that there is no deterioration in the cut surface even if the thickness 48 of the cut portion is large, though there may be cracks in the case of using a punch of normal temperature. Thus there is no defect in the optical element made of the optical preform of this embodiment.

Moreover, the optical preform obtained by this embodiment has no residual stress or distortion such as in the gate portion of the injection-molded preform in the prior art. Therefore, the optical element obtained by pressing this optical preform has good optical properties without no residual stress.

The conduit for supplying the optical material can be provided in the center portion of the lower mold instead of the upper molds. Alternatively, the conduit may be provided independently from the upper and lower mold.

It may be possible to mold a set of optical preforms by supplying a pressurized molten optical material between upper and lower molds secured with a predetermined distance between them instead of pressing the optical material supplied between the upper and lower molds.

In the die punching step, the die may be heated instead of the punch to suppress the deterioration of the cut surface. The clearance between the punch and the die, the inner diameter of the die, the temperature of the punch (or the die) may be changed according to the thickness of the cut portion or the outer diameter of the cut optical preform. It is possible to use cutting with heating by ultrasonic vibration for separating the optical preform from the set of optical preforms instead of die punching.

[Fourth Embodiment]

A cross section of a press mold and an optical material in the fourth embodiment according to the present invention is same as the second embodiment shown in FIGS. 8(a) and 8(b). The upper and lower mold 25, 26 in this embodiment also comprise a plurality of inner molds 31 and a main mold 32 as shown in FIGS. 9A and 9B.

The inner molds 31 of this embodiment are made of a flint glass (SF8). In an example, each inner mold has a dimension of 7 mm×7 mm×10 mm. The main mold is made of a stainless steel and has a dimension of 50 mm×50 mm×15 mm. The main mold has a recess receiving twenty-five inner molds arranged in a 5×5 matrix. The bottom of the recess has twenty-five through holes 33. Each through hole 33 has a diameter of 3 mm and is located corresponding to the bottom of one of the inner molds.

The reason why the inner molds are made of glass in this embodiment is that it is easy to produce many inner molds using a mother mold. The profile of the mother mold can be copied easily by heat and press of a glass lump between upper and lower molds. The flint glass is suitable for a material of a mold as it has good properties, including waterproof and acid-proof.

The press head 27 and the press stage 28 in FIGS. 8(a) and 8(b) were controlled at the predetermined temperature for heating the optical material 29 supplied between the upper mold 25 and the lower mold 26 to the temperature of 180 degrees centigrade in about three minutes. After the optical material had reached the temperature of 180 degrees centigrade, the press head 27 and the upper mold 25 were forced downward to press the optical material 29 and changed its shape. The amount of change in shape was adjusted by controlling the descent of the press head. After the predetermined amount of change in shape was completed, the press-molded optical material 30 was cooled down to the temperature of 130 degrees centigrade, under the softening temperature.

Then, the press head 27 was raised to release the upper mold 25 for taking out the press-molded optical material, i.e., a set of optical preforms 30. Separation of the optical preform from the set of optical preform was performed with a rotating tool as shown in FIGS. 11(a) and 11(b) of the second embodiment. The obtained optical preform had no residual stress or distortion, so that an optical element made of this preform showed good optical properties.

This embodiment has the same merit as the second embodiment, that is easiness of maintenance of the press mold because each of the upper and lower molds comprises inner molds received in a main mold. Moreover, the cost of the inner molds is reduced in this embodiment because they are made of glass. This embodiment has another advantage that optical elements, i.e., final products with good stable properties can be mass-produced because the many identical inner molds can be made by using a mother mold.

What is claimed is:

1. A method for making optical preforms of optical elements by processing an optical material, the method comprising steps of:

supplying said optical material made of a plastic material between upper and lower molds, said upper mold having a plurality of recesses arranged in a predetermined pitch, each recess corresponding to a first surface shape of said optical element, said lower mold having a plurality of recesses facing said recesses of the upper mold, each recess of the lower mold corresponding to a second surface shape of said optical element;

pressing said optical material to form a set of optical preforms; and separating each optical preform from said set of optical preforms.

2. The method according to claim 1, wherein said optical material is a blank made by injection molding.

3. The method according to claim 1, wherein said optical material is a plate material.

4. The method according to claim 1, further comprising a step of heating the optical material to be supplied between said upper and lower molds up to a temperature over the glass transition point of said optical material.

5. The method according to claim 1, wherein said optical material is a molten material.

6. The method according to claim 1, wherein at least one of said upper and lower molds is made of porous metal.

7. The method according to claim 1, wherein at least one of said upper and lower molds comprises a plurality of inner molds made of porous metal provided with said recesses, and a main mold receiving said inner molds arranged in a predetermined pitch.

8. The method according to claim 1, wherein at least one of said upper and lower molds comprises a plurality of inner molds made of glass provided with said recesses, and a main mold receiving said inner molds arranged in a predetermined pitch.

9. The method according to claim 1, wherein the step of separating each optical preform includes die punching.

10. The method according to claim 1, wherein the step of separating each optical preform includes cutting with a rotating tool.

11. A method for making optical elements via optical preforms by pressing an optical material, the method comprising steps of:

supplying said optical material made of a plastic material between upper and lower molds, said upper mold having a plurality of recesses arranged in a predetermined pitch, each recess corresponding to a surface shape of said optical element, said lower mold having a plurality of recesses facing said recesses of the upper mold, each recess of the lower mold corresponding to an opposite surface shape of said optical element;

pressing said optical material to form a set of optical preforms;

separating individual optical preforms from said set of optical preforms; and pressing the individual optical preforms to form optical elements having a final upper and lower surface shape.

12. The method according to claim 11, wherein the step of pressing said each optical preform includes heating said optical preform up to the temperature over the glass transition point for deforming said optical preform by the pressure and further pressing while cooling said optical preform down to the softening temperature.

13. The method according to claim 11, wherein said optical material is a blank made by injection molding.

14. The method according to claim 11, wherein said optical material is a plate material.

15. The method according to claim 11, further comprising a step of heating the optical material to be supplied between said upper and lower molds up to a temperature over the glass transition point of said optical material.

16. The method according to claim 11, wherein said optical material is a molten material.

17. The method according to claim 11, wherein at least one of said upper and lower molds is made of porous metal.

18. The method according to claim 11, wherein at least one of said upper and lower molds comprises a plurality of inner molds made of porous metal provided with said recesses, and a main mold receiving said inner molds arranged in a predetermined pitch.

19. The method according to claim 11, wherein the step of separating each optical preform includes die punching.

20. The method according to claim 11, wherein the step of separating each optical preform includes cutting with a rotating tool.

21. A method for making optical elements directly from an optical material, the method comprising steps of:

supplying said optical material made of a plastic material between upper and lower molds, said upper mold having a plurality of recesses arranged in a predetermined pitch, each recess corresponding to a first surface shape of said optical element, said lower mold having a plurality of recesses facing said recesses of the upper mold, each recess of the lower mold corresponding to a second surface shape of said optical element;

pressing said optical material between said upper and lower molds to form a set of optical elements having a final upper and lower surface shape; and separating individual optical elements from said set of optical elements.

22. The method according to claim 21, wherein said optical material is a blank made by injection molding.

23. The method according to claim 21, wherein said upper and lower molds are made of porous metal.

24. The method according to claim 21, wherein at least one of said upper and lower molds comprises a plurality of inner molds made of porous metal provided with said recess, and a main mold receiving said inner molds arranged in a predetermined pitch.

25. The method according to claim 21, wherein at least one of said upper and lower molds comprises a plurality of inner molds made of glass provided with said recess, and a main mold receiving said inner molds arranged in a predetermined pitch.

26. The method according to claim 21, wherein the step of separating each optical element includes die punching.

27. The method according to claim 21, wherein the step of separating each optical element includes cutting with a rotating tool.

* * * * *